United States Patent
Houchard et al.

(10) Patent No.: US 9,946,520 B1
(45) Date of Patent: Apr. 17, 2018

(54) CONVERSION OF INTERPRETIVE LANGUAGE FUNCTIONS INTO WEB APPLICATIONS OR SERVICES

(71) Applicant: MathNimbus Inc., Southlake, TX (US)

(72) Inventors: Jeff Houchard, Kihei, HI (US); Alex Cabello, Kahului, HI (US)

(73) Assignee: MATHNIMBUS INC., Colleyville, TX (US)

( * ) Notice: Subject to any disclaimer, the term of this patent is extended or adjusted under 35 U.S.C. 154(b) by 14 days.

(21) Appl. No.: 15/054,989

(22) Filed: Feb. 26, 2016

Related U.S. Application Data (60) Provisional application No. 62/121,397, filed on Feb. 26, 2015.

(51) Int. Cl.
    *G06F 9/445*   (2018.01)
    *G06F 9/45*    (2006.01)
    *H04L 29/08*   (2006.01)
    *G06F 9/44*    (2018.01)

(52) U.S. Cl.
    CPC ........... *G06F 8/41* (2013.01); *G06F 8/31* (2013.01); *H04L 67/02* (2013.01)

(58) Field of Classification Search
    USPC .......................................................... 717/139
    See application file for complete search history.

(56) References Cited

U.S. PATENT DOCUMENTS

| | | | |
|---|---|---|---|
| 2008/0162531 A1* | 7/2008 | van Eikeren | G06F 9/465 |
| 2012/0240135 A1* | 9/2012 | Risbood | G06F 8/61 |
| | | | 719/328 |
| 2014/0122986 A1* | 5/2014 | Spada | G06F 17/2264 |
| | | | 715/212 |
| 2015/0381735 A1* | 12/2015 | Pascual | G06F 3/0484 |
| | | | 715/753 |
| 2016/0018962 A1* | 1/2016 | Low | G06F 8/34 |
| | | | 715/771 |
| 2016/0142868 A1* | 5/2016 | Kulkarni | H04W 4/008 |
| | | | 455/456.5 |
| 2016/0162820 A1* | 6/2016 | Povalyayev | G06Q 10/0635 |
| | | | 705/7.28 |

* cited by examiner

*Primary Examiner* — Chameli Das
(74) *Attorney, Agent, or Firm* — Peacock Law P.C.; Jeffrey D. Myers; Justin Jackson (57) ABSTRACT

A method (and concomitant apparatus and non-transitory computer-readable medium comprising machine readable code) for automatically deploying World Wide Web services from any function written in an interpretive computer language, comprising creating a new cloud workspace for a function written in an interpretive computer language, receiving the function and storing it in the cloud workspace, establishing an interpreter for the interpretive computer language, and allowing for execution of the function by the interpreter via the internet or an intranet.

15 Claims, 4 Drawing Sheets

Figure 1. Automated Conversion Process Context

Figure 2. WIDE Used To Upload or Create Source Code

Figure 3 - Logic Flow as Seen by the User Highlighted

Figure 4

Figure 5. WIDE Used To Identify Functions to be Converted to Services

Figure 8 - WIDE Converting Functions to Services

CONVERSION OF INTERPRETIVE LANGUAGE FUNCTIONS INTO WEB APPLICATIONS OR SERVICES

CROSS-REFERENCE TO RELATED APPLICATIONS

This application claims priority to and the benefit of the filing of U.S. Provisional Patent Application Ser. No. 62/121,397, filed on Feb. 26, 2015, and the specification and claims thereof are incorporated herein by reference.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

COPYRIGHTED MATERIAL

© 2016 MathNimbus, Inc. A portion of the disclosure of this patent document and of the related application listed above contains material that is subject to copyright protection. The owner has no objection to the facsimile reproduction by anyone of the patent document or the patent disclosure, as it appears in the Patent and Trademark Office patent file or records, but otherwise reserves all copyrights whatsoever.

BACKGROUND OF THE INVENTION

Field of the Invention (Technical Field)

The present invention relates to methods, apparatuses, and computer software stored on non-transitory computer readable media for converting interpretive language functions into World Wide Web ("Web") Applications and/or Web Services.

Description of Related Art

The current state of the art requires applications written in interpreted languages such as MATLAB, OCTAVE, IPYTHON, SCILAB, RUBY, and R brand software to be rewritten or manually combined with traditional web languages or services to produce Web Applications or Web Services. Note that OCTAVE, IPYTHON, SCILAB, RUBY, and others are trademarks or registered trademarks of their respective owners for computer software, and each use of such terms herein should be read to include the generic term.

Algorithmia, Wolfram, and Mathworks are developing related solutions, but their solutions are limited to a particular language and/or require additional coding to an API. Algorithmia requires algorithms to be written in Java and adhere to an API. Wolfram only supports their product, Mathematica. Mathworks provides toolboxes, but require additional code and infrastructure management. In all cases, there is no common way to completely automate services from functions written in different languages as with the present invention.

BRIEF SUMMARY OF THE INVENTION

The present invention is of a method (and concomitant apparatus and non-transitory computer-readable medium comprising machine readable code) for automatically deploying World Wide Web services from any function written in an interpretive computer language, comprising: creating a new cloud workspace for a function written in an interpretive computer language; receiving the function and storing it in the cloud workspace; establishing an interpreter for the interpretive computer language; and allowing for execution of the function by the interpreter via the internet or an intranet. In the preferred embodiment, the interpretive computer language is selected from the group consisting of BASIC, MATLAB, OCTAVE, IPYTHON, SCILAB, RUBY, and R brand software. Allowing for execution of the function comprises employing WIDE UI and/or REST API, most preferably employing a REST eval command.

Further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings:

FIG. 4 shows internally how the invention leverages a Workspace infrastructure which provides the remote computational and storage facilities (cloud environment). Label-6 in the FIG. 4, L6 for brevity, shows the WIDE user interface (UI) components that are loaded into the user's browser when they connect to the WIDE Service interface (L1) using the UI web application URL. WIDE also provides the same capabilities using built-in REST services (L2) that can be invoked externally under program control, for example using cURL or other URI/URL scripting/programming facilities, using the request/response command interface shown at L1 with service specific URIs. At this stage a user or an external service defines a new Workspace by selecting the interpreter type to be provisioned instantiating L3 then chooses to a.) upload existing code using the Workspace REST service via L1 or b.) selecting the file to upload using the WIDE UI file manager (L6) or c.) develop new code using the WIDE UI (L6) editor component. The end result is to load source code, from the user or external program or script, into the Cloud Workspace as shown at L4;

FIG. 5 shows the process DFD which determines the list of functions which will be converted automatically to services. The list of functions is supplied a.) directly by the user or b.) externally as a REST service, or c.) optionally through a user or REST service regular expression file/directory filter used to select the files to be converted to services. Using option c.) all functions in every file selected by the regular expression file and directory filter are converted automatically to a service (e.g., the file regular expression /*.m/ would select all files ending in a /*.m/ extension). By default the source code path is included as part of the web service name identification which allows for URI namespaces to avoid potential name collisions (e.g., /namespace1/function1 and/namespace2/function1 can be different services even though the function names are identical) as is the commonly used convention for REST services. Further, this convention allows related services to be aggregated under the same namespace path (e.g. /math/statistics/functionName);

FIG. 7 provides detail on how this process again leverages the Cloud Workspace infrastructure to specify which functions or which directories and files to search (regular expression) for functions to be converted automatically to web services and, optionally, to a web application. WIDE provides a.) language functions (L3a) that can be invoked by the Cloud Workspace developer under program control from the selected Language Interpreter or (b.) a graphical file selection Interface (L6) from WIDE UI or c.) a REST service (L1, L2) that can be used under program control; any of which can be used separately without the others, to select the functions to be converted automatically to REST services. As described previously, web service names identified from the function source code (L4) include the full path, i.e., directories in which the source code file which contains the selected function is found, for inclusion into the web service URI;

FIG. 8 shows that once the source files are resident in the Cloud Workspace as shown in FIG. 2, Automated Conversion Process 1 (or ACP-1), and the functions to be converted to services are identified, FIG. 5 Automated Conversion Process 2 (ACP-2), the invention will automatically convert these functions into web services as shown in FIG. 8, ACP-3. This process is shown completely in the Detailed Description. In summary, by default, the path and function name identified in ACP-2, are added dynamically to the Workspace web server and invoked using an "eval" REST service. Using the selected language (ACP-1) a corresponding language interpreter is started wrapping standard input (stdin), standard output (stdout), and standard error (stderr) streams forming the "eval" service engine. The input to the eval engine is the function name and parameters. A JS ON return message is formed with the function to be evaluated as the "input" key (function name and parameters) and the function output is streamed from the eval engine filling in the JSON structure item identified by the "output" key;

FIG. 10 provides additional detail on how this process again leverages the Cloud Workspace infrastructure as shown in L5 to provide an on-demand process to automatically scan the previously selected source code (resident at L4) to identify each entry function name and parameters. Once the function names and file paths are identified, the service name map (URI) is dynamically extended using L7 with the full path and function name as discussed previously. When an external client (browser or script) presents this URI to the Workspace interface at L9 (request), the dynamic service map invokes a REST service which, if not running, starts selected interpreter L3, and invokes an interpreter "eval" command with the requested URI function name and URL in-line or HTTP body parameters. Once the eval is complete, an HTTP response is provide back at L9 (response) to the client (browser or script). All such functions identified and converted to services define the Invention Automated Service REST API (L8) that is now available worldwide on demand.

DETAILED DESCRIPTION OF THE INVENTION

The present invention provides a new process (and computer software embodied on a non-transitory computer-readable medium) for automatically deploying Web Services from any function written in an interpretive language (automating Software as a Service or SaaS). The invention provides the ability to automatically deploy Web Applications that connect to Web Services using non-web-traditional interpretive languages. The invention provides the ability to automatically create a Web Application or Web Service using one or more analytical languages including, but not limited to, BASIC, MATLAB, OCTAVE, JULIA, IPYTHON, SCILAB, RUBY, and R brand software. The present invention is directed primarily toward users of analytical interpretive language, typically scientists, engineers, and statisticians, so that they can automatically deploy a Web Application or Web Service using only their analytical language of choice, without requiring additional tools or outside language expertise.

Interpretive numerical computing languages used by the scientific and engineering community such as BASIC, MATLAB, OCTAVE, JULIA, IPYTHON, SCILAB, RUBY, and R brand software encapsulate reusable tasks as functions. It is often desirable to make these functions available as a web applications and/or web services. Current state of the art requires this process to be done manually using tools such as JAVA or JAVASCRIPT brand software to support the web implementation. For those unfamiliar with the skills required, the process can be tedious, error prone, and time consuming. What follows is a description of a new invention that automates this process which eliminates the need for the specialized skills required to implement a web application or service. The term "Cloud Workspace" will be used to include the invention software and any necessary supporting hardware infrastructure such as processor, memory, and networks required to automatically deploy the invention to the cloud.

Objective 1: This invention allows a scientist or engineer using interpretive languages to directly deploy a complete Web Application available worldwide, runnable in web browser using a Uniform Resource Locater (URL).

Objective 2: This invention allows a scientist, engineer, or subject matter expert using interpretive languages to directly deploy a REpresentational State Transfer (REST) service using a public or restricted Uniform Resource Identifier (URI).

Objective 3: This invention allows a remote (machine) process or script to automatically deploy services or web applications using REST methods which a.) upload functions (analytical language code) and b.) publish the uploaded functions as REST services, and optionally c.) provide a web application to access the REST services.

Leveraging the previously described automated generation of web services, this invention also provides the capability to automatically generate a complete Web Application. For example as is popular today, a "Single Page Web Application" can be automatically created, using WIDE UI under user control or using a REST service under program control (reference L1-L2 in FIG. 7), as a simple client-side form corresponding to the function and parameters created or uploaded by the user (reference L4 in FIG. 7). In this case WIDE UI or REST service parses the function name and parameters and produces an HTML client form, delivered to the users browser, to access the generated REST services with the function specified parameters. The invention also provides language functions, in the interpretive language syntax (reference L3a in FIG. 7), so that a custom Single Page Web Application may be configured by the developer. Finally the WIDE UI can also be used to customize the web application using configurable drag-and-drop widgets dynamically configured from the REST services API automatically generated (reference L8 in FIG. 10).

Figure 1:
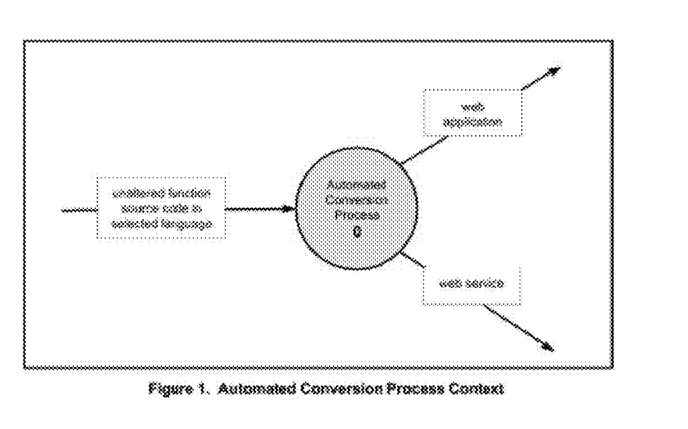
FIG. 1 depicts a Data Flow Diagram (DFD) of the automated process at the highest level (level 0). This DFD will be decomposed into lower level DFDs as each step of the process is described. Figures which represent the user or machine automation perspective will also be provided at each step of the process.
Figure 2:
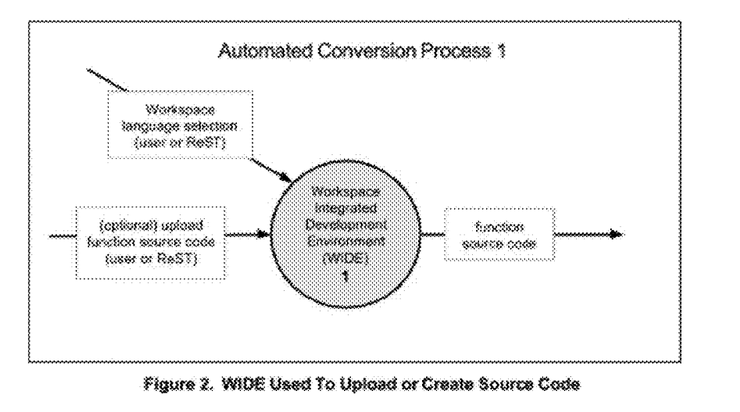
FIG. 2 provides a DFD of the process where the inputs can be from a user interaction or an external REST service. The net result is the unaltered, interpretive language source code is loaded into the Cloud Workspace.
Figure 3:
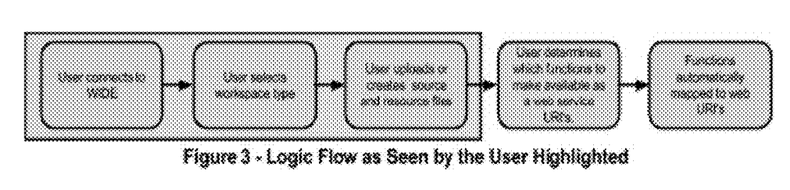
FIG. 3 shows the logic flow for seen by the user developing a Web Application or Web Service or both. The user connects to the Workspace Integrated Development Environment (WIDE) and selects their analytical language of choice (e.g., MATLAB, OCTAVE, IPYTHON, SCILAB, RUBY, R brand software, etc.). This automatically creates the necessary Cloud Workspace infrastructure to run and store the user's application (function source code) and tailors the WIDE relative to their selected language. Although WIDE user interface provides a convenient, collaborative cloud development environment for the user to develop and deploy services, it should be noted that the invention can be utilized entirely using the underlying REST services, for example under script or program control.
Figure 4:
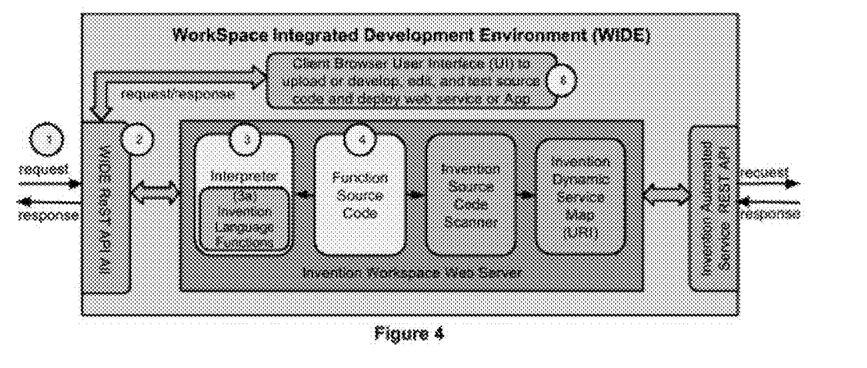
Figure 5:
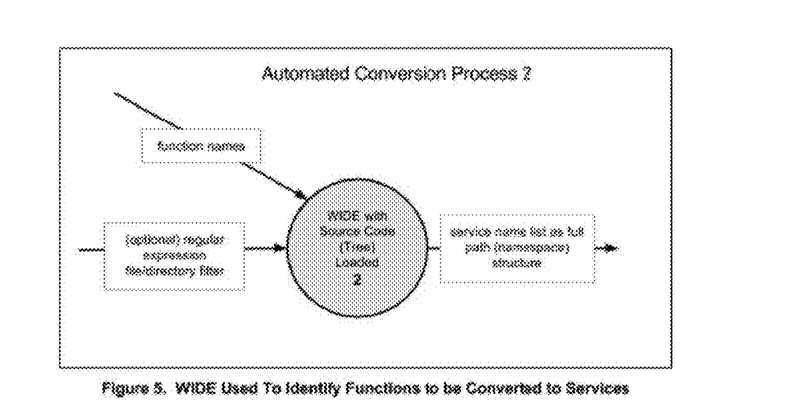
Figure 6:
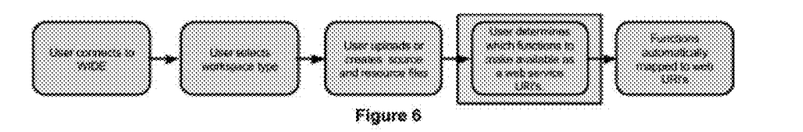
FIG. 6 highlights this step from a user perspective when the WIDE is used interactively under user (not program) control.

As shown in FIG. 1, the invention automatically converts functions written in the Interpreters language into REST services and optionally a web application. The invention requires only the user's source code written in their Interpretive language of choice, and provides all necessary cloud infrastructure to automatically deploy a web service or web application using the invention REST API. As described previously a user can, alternatively, use the WIDE UI to perform the selection of functions to be automatically converted. Since the WIDE UI is simply the user interface which in turn invokes the REST API, the built-in Cloud Workspace REST API only and not the WIDE UI will be used in the detailed description that follows.

Figure 7:
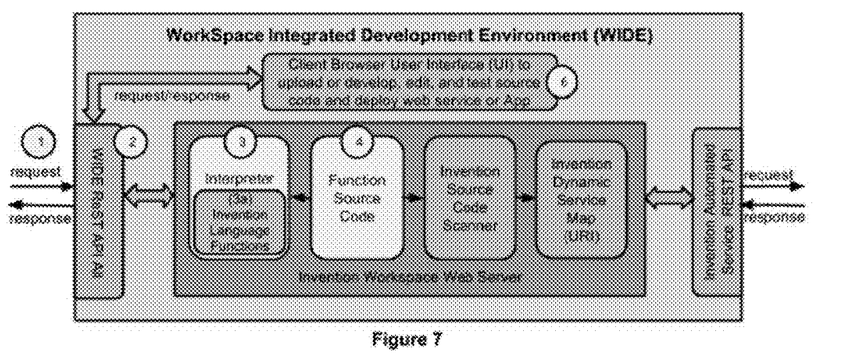
Figure 8:
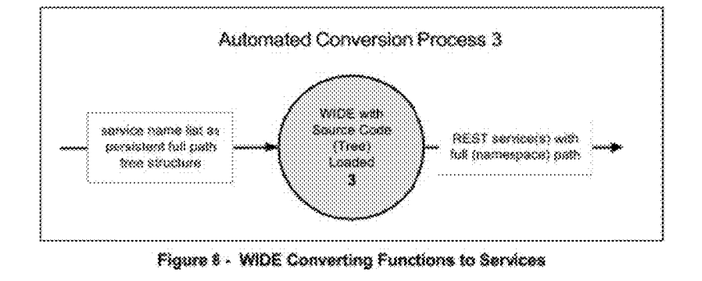
Figure 9:
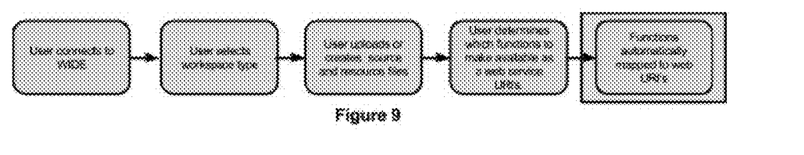
FIG. 9 highlights the final step when the functions identified are automatically converted to a REST web service.
Figure 10:
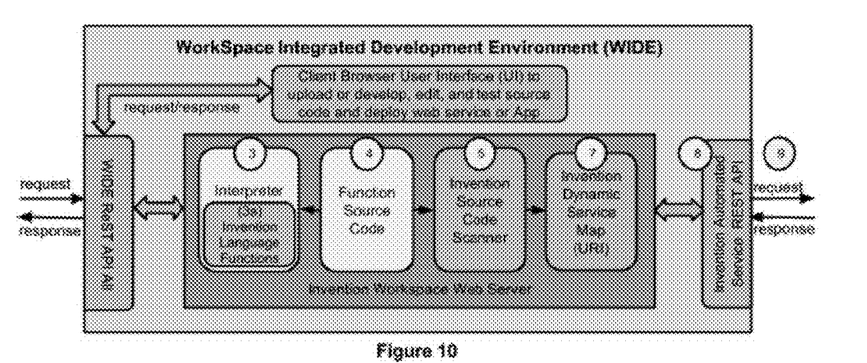

Once the user Source Code is in place, functions are identified for automatic conversion and deployment to REST services using the Cloud Workspace REST API (FIG. 7, L1-L2). The Cloud Workspace REST API includes methods to invoke the Source Code Scanner (FIG. 10, L5) to search the user Source Code for all matching functions based on two regular expressions as part of the REST command parameter payload; the first regular expression is a directory filter, the second is a file filter. If the identified function is in one or more subdirectories, the subdirectory names are included in the auto generated REST URI. For example, the following URI shows the organization for a function within a single subdirectory:

/cloud/service/subdirectory_name/function_name.

Each URI determined by the Code Analyzer is placed in the URI Dynamic Service Map (L7 in FIG. 10) which includes a full path to the Source Code file.

The Dynamic Service Map defines a new REST API (L8 in FIG. 10), When a URI is sent to this REST API (L9 response in FIG. 10), as for example (preceded, of course, by http://):

example.com/cloud/service/
 signalToNoiseRatio?flux=1000&noise=
 100&background=10 and the URI string after /cloud/service/ is examined for a regular expression match with the stored Dynamic Service Map entries. If a match is found, the remaining string is parsed into parameters, in this case flux=1000, noise=100, and background=10. The function is invoked on the Interpreter (L3 in FIG. 10) for evaluation using the stored path from the URI Dynamic Service Map to the Source Code function (L4 in FIG. 10) as for example:

path_to_function/signalToNoise(1000, 100, 10)

A JSON REST response is returned to the originator through (1). For example:

{"input":path_to_function/signalToNoise(1000, 100, 10), "output": {"snr":"9.53029492430494"}}

It should be noted that the invention also auto generates REST services with the POST verb which accept parameters in the HTTP header. For example (preceded, of course, by http://):

example.com/cloud/service/signalToNoiseRatio using the http header

{"flux":"1000", "noise":"100", "background":"10"} in place of the URI parameters in the previous example. This can be more convenient, especially when there are many parameters. In this example the user request and the response of the REST service is stateless which is typical. Such services can support multiple connections (Users) since they do not change the state of variables which could affect the result of service or the result of related services in the future. For services that do change state the service can be configured to automatically start a new Interpreter with each new connection. In this way each connection gets an independent set of variables.

Like the build-in REST API methods, permissions to execute auto generated REST API methods can be configured by the Cloud Workspace owner.

The invention provides a common Workspace Integrated Development Environment for development from a web browser. A working prototype that interfaces with the Cloud Workspace REST API was developed and is described in the next section.

For customized Web Application development one preferred embodiment of this invention leverages the interpretive language's general capability to extend the language (L3a in FIG. 10) using same language syntax by writing functions or using language extensions. Language extensions (e.g. MATLAB brand computer software Mex files) allows direct access to Workspace infrastructure to automatically bind the Workspace language to Web components. The Web components are automatically configured and launched for the user when the user invokes the language extension(s). A WIDE layout manager can be used to position the web application components.

For fully automated Web Application generation one preferred embodiment of this invention provides a form entry for functions/parameters corresponding to the REST API (L8 in FIG. 10). This embodiment can also include graphical output for specified functions if enabled.

A preferred embodiment of this invention Cloud Workspace which includes computer infrastructure, including computer resources and storage, and a language independent application interface implemented with REST using the Hypertext Transfer Protocol (HTTP) transport. The preferred embodiment employs the Workspace as a Platform as a Service (PaaS). This embodiment implements a common REST interface across all supported languages to directly invoke the Workspace PaaS.

The first preferred embodiment of this invention provides a single REST service built Into the Cloud Workspace, which scans the Workspace source directory for functions specified in the REST payload for automatic conversion. The scan locations are filtered using a directory and file regular expression rest syntax as part of the REST payload. The source code tree is scanned completely (recursively) using the specified filters to automatically convert each matching function into a persistent web service. If the source code tree contains a directory hierarchy the hierarchy (directory names) are used as part of the URI. For example the REST command (preceded, of course, by http://):

104.130.154.185:3500/mcloud/publish/path with the JSON payload shown below would scan all directories starting a path "./" (root) of the Workspace identified by UUID key 98380e46-f7c6-458e-80cb-af300bb02a34 and automatically convert functions defined in files of type "*.m" (filefilter) into a web service. In this case there is no directory filter (dirfilter:none) so all directories starting at the root path are scanned.

{
"key":"98380e46-f7c6-458e-80cb-af300bb02a34",
"path":"./",
"dirfilter":"none",
"filefilter":".\\.m$"
}

A second preferred embodiment of this invention provides a set of commands, for each specific language, which provides the same functionality as item 4 but do not require the any knowledge of the underlying REST interface (reference L3a in FIG. 10). The extensions are not required to deploy a service but can be used to access all functionality of the PaaS, if desired, under interpretive language program control.

In the preferred embodiment a common Cloud Workspace interface is used across all languages to implement the binding between the particular language extensions and the common Workspace web components such as web servers.

The preferred embodiment for a Web Application provides a web-based Workspace Integrated Development Environment (WIDE) to develop new or edit existing analytical algorithms using the user's analytical language of choice including language extension inventions to automatically deploy Web Services and (optionally) a Web Application. The preferred embodiment will alternatively, at the users discretion, provide a WIDE graphical user interface (GUI) Layout Manager (GLM) tool which allows the user place and size predefined widgets, selected from a palette. Once configured, the user is provided the option to automatically generate and deploy the web application mapping the component to the Workspace service. An output of invoking the language extension(s) or GUI layout tool is a Uniform Resource Locater (URL) providing access to the user deployed application worldwide using only a browser.

The preferred embodiment for a Web Service provides a web-based Workspace Integrated Development Environment (WIDE) to develop new or edit existing analytical algorithms using the user's analytical language of choice including automatically deploy a Web Service. The WIDE will provide facilities to select which functions to deploy as a web service. Each function selected will have a Uniform Resource Identifier (URI) providing access to the set of user deployed services worldwide using only a simple REST client or as part of a deployed Web Application.

A variety of alternative embodiments are possible using this invention. The preferred embodiment is based on common web-service standards including a language independent REST interface using HTTP protocol to implement the Workspace PaaS providing scalability and ease of implementation. Embodiments not relying on this architecture are described next.

Alternative Embodiment 1

REST/HTTP transport is not used but instead direct function calls using language extensions to invoke web-services. Such an embodiment would require additional custom interface code for each language whereas the preferred embodiment uses a common interface across all languages. Further the preferred, loosely coupled, implementation provides the ability to scale across computing resources allowing the web-services to be on different computing resources from the language interpreter while direct function calls used in Embodiment 1 would not.

Alternative Embodiment 2

HTTP transport is not used but the overall architecture is unchanged. Such an embodiment may be desired to improve transport efficiency if large data transfers or low latency is required. A number of more efficient transport protocols are commonly available such as ZeroMQ or MPI.

Alternative Embodiment 3

Both the REST interface and HTTP transport are replaced with alternatives that still provide the loose coupling to scale across resources unlike Alternative Embodiment 1 [9]. Examples might include a custom socket interface or legacy Simple Object Access Protocol (SOAP) with a custom or higher performance protocol.

A working model of the Cloud Workspace Automatic Web Service Deployment invention was developed in javascript using node.js on RACKSPACE infrastructure (full details, including the working model source code, are provided in subsequent sections). RACKSPACE OPENSTACK, open source software, is used to provide Infrastructure as a Service (IaaS) to allocate computer resources for the Cloud Workspace. OCTAVE, a popular open source alternative to MATLAB brand software, was used to demonstrate automated service deployment using this non-traditional web language. OCTAVE represents only one of many sophisticated analytical interpretive languages that can be used with this invention to produce powerful web services accessible worldwide.

The following steps describe how a web service is automatically deployed in Octave using the invention from the REST service perspective using the Cloud Workspace. Shown in italics is the underlying REST service and description of the invention operations.

A program, or function, or group of functions are first developed on a local computer using standard techniques and environmental tools in the user language of choice (Octave for this example). Alternatively the program can be developed or edited using the Cloud Workspace WIDE user interface (reference L6 in FIG. 10).

A new Cloud Workspace is created using a:
REST POST service using the URI:
/mcloud/interp/start
which returns a JSON structure with a universally unique identifier (uuid) as for example:
{"key": "98380e46-f7c6-458e-80cb-af300bb02a34"}
to uniquely identify this Cloud Workspace including any resources. In the working model, this REST service starts the Octave interpreter as a Unix process on the server using the node.js exec command and connects standard input (stdin), standard output (stdout), and standard error (stderr) to node.js streams. A REST interface is provided to send commands to Octave through stdin and asynchronously receive the stdout and stderr output. The browser based IDE provides an input window in which user input lines are sent to the, interpreter, on the server, and the response from the interpreter is sent back to the user.

The user program, function, or set of functions is uploaded using another REST service. The program or functions can include a hierarchical set of directories uploaded individually or as a zip file. Optionally, for functions or programs within a given directory, the directory name can be part of the URI to access the user deployed service.

A REST POST service using a URI for example:
/mcloud/fileops/upload?key=98380e46-f7c6-458e-80cb-af300bb02a34&path=file.zip
to upload the file given parameters "key" and "path. The key parameter associates the uploaded file resources to become part of the Cloud Workspace created in step B.

Once the code is uploaded, a third REST service is used to select which functions or programs will be provided as services. The selection is made from a list derived from all user source code modules available in the Cloud Workspace.

The IDE invokes a REST POST service URI:
/mcloud/publish/path
with the REST http body provide as a JSON structure for example:
{
"key":"98380e46-f7c6-458e-80cb-af300bb02a34",
"path":"./",
"filefilter":".*\\.m$",
"dirfilter":"none",
}

This REST command will search the "path" starting at the root directory of the user source code ("./") in the Cloud Workspace associated with "key" 98380e46-f7c6-458e-80cb-af300bb02a34. All subdirectories will be searched since the directory filter is set to "none" ("dirfilter":"none"). In general the directory filter can be set to a regular expression to select or exclude directories to process. Only files ending with a ".m", the convention for Octave source files, will be processed for inclusion in the set of services as specified by the regular expression file filter ("filefilter": ".*\\.m$"). Each source file which matches the directory and file filter is processed and the full path and function is combined as part of a URI comparison string. The URI includes the full path (all subdirectories) allowing the user to organize the URI resources. Before being entered into the database, the URI comparison is modified to be regular expression search string. All URI regular expressions are combined into an array for efficient comparison with the user URI.

Assuming an OCTAVE source file sumit.m was uploaded in step 3 that contained a function written to return the sum an input array a as for example:
function [isum]=sumit(a) isum=sum(a);

then issuing a command from the web such as (preceded, of course, by http://):
example.com/mcloud/service/sumit?key=98380e46-f7c6-458e-80cb-af300bb02a34&p1=[1 2 3 4 5 6 7 8]
an alternate example with key being part of the UID instead of a parameter (preceded, of course, by http://):
example.com/mcloud/98380e46-f7c6-458e-80cb-af300bb02a34/sumit?p1=[1 2 3 4 5 6 7 8]
would result in a match with the stored "^Vsumit$" regular expression stored in step 4.

An REST eval command is sent to the interpreter by parsing the URI parameters after /mcloud/service as a JSON structure as follows:
{"input":"path_to_source/sumit([1 2 3 4 5 6 7 8])"}
where path_to_source is the actual file path to the user source code for the sumit function determined in step 4. The result of the Octave interpreter eval command is returned in a JSON structure as:
{"output":36}

An implementation of the invention was developed as detailed in the section Invention Implementation with source code found in U.S. Provisional Patent Application Ser. No. 62/121,397. The example therein illustrates developing and publishing a simple service using the exemplary implementation including basic WIDE capabilities. It should be noted that the WIDE UI invokes the REST services as described previously.

In summary, the present invention allows software written in interpreted languages to be deployed as Web Applications or Web Services without developing additional code. The invention allows users of interpreted languages to directly deploy a Web Application or Web Service within the language itself not requiring the user to recode in a traditional web language. Exemplary embodiments extend the capability of analytical languages such as MATLAB, OCTAVE, IPYTHON, SCILAB, RUBY, and R brand software to automatically provide Web Services or Web Applications within the given language using a remote computational and storage environment. The preferred embodiment provides a "Cloud Workspace" Platform as a Service (PaaS) which automatically converts functions into services automating Software as a Service (SaaS).

In the preferred embodiment, and as readily understood by one of ordinary skill in the art, the apparatus according to the invention will include a general or specific purpose computer or distributed system programmed with computer software implementing the steps described above, which computer software may be in any appropriate computer language, including C++, FORTRAN, BASIC, Java, assembly language, microcode, distributed programming languages, etc. The apparatus may also include a plurality of such computers/distributed systems (e.g., connected over the Internet and/or one or more intranets) in a variety of hardware implementations. For example, data processing can be performed by an appropriately programmed microprocessor, computing cloud, Application Specific Integrated Circuit (ASIC), Field Programmable Gate Array (FPGA), or the like, in conjunction with appropriate memory, network, and bus elements.

Note that in the specification and claims, "about" or "approximately" means within twenty percent (20%) of the numerical amount cited. All computer software disclosed herein may be embodied on any computer-readable medium (including combinations of mediums), including without limitation CD-ROMs, DVD-ROMs, hard drives (local or network storage device), USB keys, other removable drives, ROM, and firmware.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A method comprising:
   automatically deploying World Wide Web services from a function written in an interpretive computer language, wherein automatically deploying comprises:
   providing an on-demand process to automatically scan selected source code to identify one or more entry function names and parameters to dynamically extend a service name map;
   automatically creating a new cloud workspace for the function written in an interpretive computer language;
   receiving the function and storing it in the cloud workspace;
   establishing an interpreter for the interpretive computer language;
   allowing for execution of the function by the interpreter via the internet or an intranet;
   scanning a source code tree for matching functions using specified filters and automatically converting each matching function into a persistent web service; and
   wherein allowing for execution of the function comprises an element selected from the group consisting of WIDE UI and REST API.

2. The method of claim 1 wherein the interpretive computer language is selected from the group consisting of BASIC, MATLAB, OCTAVE, IPYTHON, SCILAB, RUBY and R.

3. The method of claim 2 wherein the interpretive computer language is MATLAB.

4. The method of claim 1 wherein allowing for execution of the function comprises employing a REST eval command.

5. The method of claim 1 wherein automatically deploying World Wide Web services from a function written in interpretive computer language comprises automatically converting a list of functions to services.

6. An apparatus comprising:
   a server computer automatically deploying World Wide Web services from a function written in an interpretive computer language;
   a server computer automatically scanning selected source code to identify one or more entry function names and parameters to dynamically extend a service name map;
   a server computer automatically creating a new cloud workspace for the function written in an interpretive computer language;
   a server computer receiving the function and storing it in the cloud workspace;
   a server computer running an interpreter for the interpretive computer language;
   a server computer scanning a source code tree for matching functions using specified filters and automatically converting each matching function into a persistent web service; and
   a server computer allowing for execution of the function by the interpreter via the internet or an intranet by the server computer employing an element selected from the list consisting of WIDE UI and REST API.

7. The apparatus of claim 6 wherein the interpretive computer language is selected from the group consisting of BASIC, MATLAB, OCTAVE, IPYTHON, SCILAB, RUBY and R.

8. The apparatus of claim 7 wherein the interpretive computer language is MATLAB.

9. The apparatus of claim 6 wherein the server computer allowing for execution of the function employs a REST eval command.

10. The apparatus of claim 6 wherein a server computer automatically deploying World Wide Web services from a function written in interpretive computer language comprises a server computer automatically converting a list of functions to services.

11. A non-transitory computer-readable medium comprising machine-readable code, said medium comprising:
    code for automatically deploying World Wide Web services from a function written in an interpretive computer language;
    code for automatically scanning selected source code to identify one or more entry function names and parameters to dynamically extend a service name map;
    code automatically creating a new cloud workspace for the function written in an interpretive computer language;
    code receiving the function and storing it in the cloud workspace;
    code running an interpreter for the interpretive computer language;
    code for scanning a source code tree for matching functions using specified filters and automatically converting each matching function into a persistent web service; and
    code allowing for execution of the function by the interpreter via the internet or an intranet by employing an element selected from the list consisting of WIDE UI and REST API.

12. The medium of claim 11 wherein the interpretive computer language is selected from the group consisting of BASIC, MATLAB, OCTAVE, IPYTHON, SCILAB, RUBY and R.

13. The medium of claim 12 wherein the interpretive computer language is MATLAB.

14. The medium of claim 11 wherein the code allowing for execution of the function employs a REST eval command.

15. The medium of claim 11 wherein code for automatically deploying World Wide Web services from a function written in interpretive computer language comprises code for automatically converting a list of functions to services.

* * * * *